United States Patent

[11] 3,590,428

[72] Inventors Edmund Munk;
Herbert Haas; Gerd Weinberg, all of Oberstenfeld, Germany
[21] Appl. No. 774,747
[22] Filed Nov. 12, 1968
[45] Patented July 6, 1971
[73] Assignee Furnier-und Sperrholzwerk, J. F. Werz Jr. R. G.
Oberstenfeld, Wurttemberg, Germany

[54] METHOD AND APPARATUS FOR MOLDING CONTAINERS
13 Claims, 4 Drawing Figs.

[52] U.S. Cl. .................................................. 18/5,
18/16, 264/122
[51] Int. Cl. ........................................... B29g 7/00
[50] Field of Search ........................................... 18/5, 5 P,
16, DIG. 26; 264/161, 122

[56] References Cited
UNITED STATES PATENTS
2,583,441  1/1952  Palmer ........................ 18/16 M
3,319,290  5/1967  Clark ........................... 18/16 M FOREIGN PATENTS
1,230,544  4/1960  France ........................ 264/161

Primary Examiner—Richard J. Herbst
Attorneys—Leslie G. Noller and John M. Crawford ABSTRACT: The molding of an angular container with an open top and with sidewalls which are outwardly inclined or provided with an outwardly projecting rim on their free edges in an upside-down position on a stationary mold core by means of horizontally movable dies and a vertically movable bottom-forming die of a mixture of a comminuted fibrous material and a hot-setting binder, wherein the dies are made of a shape so that in their compressing position the front ends of their adjacent sides overlap each other, whereby the dies not only mold the container itself but also compress and cure the mixture which has been filled into the area between each edge of the core and two adjacent retracted dies so as to form thin solid strips which extend along and project outwardly from edges of the molded container and which are to be broken off after the dies have been retracted and the container has been lifted out of the mold.

PATENTED JUL 6 1971 3,590,428

INVENTORS
EDMUND MUNK
HERBERT HAAS
GERD WEINBERG

John M. Crawford
ATTORNEYS

METHOD AND APPARATUS FOR MOLDING CONTAINERS

The present invention relates to a method and an apparatus for producing containers by molding them under heat and pressure of a mixture of comminuted fibrous materials, for example, wood or bagasse, and a hot-setting binder, for example, a urea formaldehyde resin or a melamine resin. The invention further relates to the production of containers of such materials the walls of which are either outwardly slightly inclined toward their upper rim or extend substantially vertical to the container bottom and have an upper rim of a larger circumference than that of the bottom so that in either case the rim of the container projects laterally over the bottom.

Containers of this type are generally produced in an upside-down position by applying the material about a stationary core of a suitable shape and by then compressing and simultaneously heating this material by means of a downwardly movable die and a suitable number of laterally movable dies. For removing the molded container from the mold in the upward direction thereof these dies are retracted for a sufficient distance from the core. If the container has walls which are slightly inclined toward the outside or extend vertically but have an outwardly projecting rim on their upper edges the difficulty arises that the corners of the upper edge of the container which projects laterally over the bottom and forms the lowest part of the container in the mold since the container is molded in an upside-down position lie underneath the stationary lateral guides of the dies which therefore prevent the removal of the container even if the lateral dies are sufficiently retracted. For this reason it has previously been necessary to cut off the downwardly extending rectangular corner of each of these stationary guide elements between the guide surfaces for the adjacent dies, i.e. the corner of guide element facing an upright corner of the molded container, so that in place of this corner of the guide element a surface is formed which extends obliquely to each of the adjacent guide surfaces and is set back so far from the corner of the molded container that the projecting rim of the latter may be moved easily past these oblique surfaces when the container is lifted out of the mold. By cutting off the corners of each of the stationary guide elements, a chamber of a triangular cross section is formed in which this material also collects when the dies are retracted and the material is filled into the mold. During the following compression of the material so as to form the walls of the container, the material in these chambers although not compressed is nevertheless heated so that the binder therein is cured and this material forms a loose crumbly residue which, when the dies are subsequently retracted and the container is withdrawn from the mold, falls into the mold. This material must then be completely removed from the mold before the next molding operation can be carried out. This is a difficult and time-wasting procedure and there is also always the danger that the mold might not be cleaned sufficiently with the result that the next container to be molded will be defective.

It is an object of the present invention to eliminate this disadvantage in the production of containers of the type as previously described which are made of a compressed mixture of vegetable fibers and a hot-setting binder. This object is attained according to the invention by not merely heating but also compressing the excess material which has collected in the necessary chamber along the edges between two adjacent surfaces of the stationary guide element when the mold is filled so that along the upright corner of the container a solid rod-shaped, outwardly extending projection is formed. Another feature of the invention consists in compressing this rod-shaped projection so as to be connected only by a very thin web to the corner of the container which extends parallel thereto. Since this projection including this thin web is as highly compressed and cured and has the same solidity as the walls of the container, it may be easily and completely broken off the corner of the container along the thin connecting web.

The above mentioned as well as additional features and advantages of the present invention will become further apparent from the following detailed description thereof which is to be read with reference to the accompanying drawings, in which FIG. 1 shows a horizontal section which is taken along the line I-I of FIG. 3 and illustrates a mold as employed prior to this invention in its compressed position for producing a container of the type as described.

FIG. 3 shows a vertical section of the known mold according to FIG. 1; while

Figure 1:
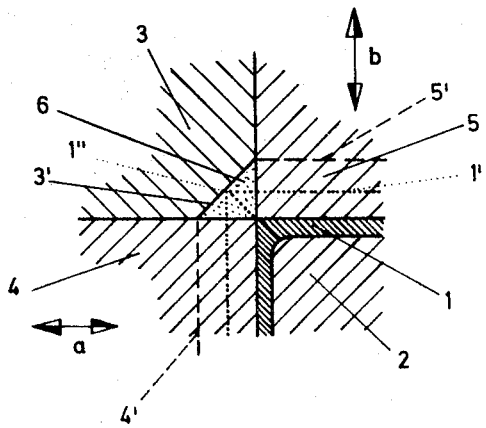

In order to explain the present invention more clearly, it is advisable first to describe briefly the method which has previously been carried out for producing such containers. FIG. 1 shows a horizontal section which is taken along the dot-and-dash line I-I of FIG. 3 transversely through a mold as previously employed and illustrates an upright corner of the container when the lateral dies 4 and 5 are in the fully compressed position, while the dash lines 4' and 5' indicate the position of these dies when retracted. The numeral 1 designates the walls of the compressed container and the numeral 2 the stationary core of the mold around which the container is molded. The lateral dies 4 and 5 are movable in the direction of the arrows $a$ and $b$ along the guide surfaces of the stationary guide element 3 of the mold. The dotted line 1' indicates the upper edge of the container which in the mold forms the lower edge since the container is molded in an upside-down position. The walls of the container are therefore to be slightly inclined toward the outside. Since the rectangular corner of the stationary guide element 3 which faces the corner 1" between the two walls 1 of the container would prevent the finished container from being removed from the mold, it has previously been necessary to cut off this corner of the guide element 3 at an angle of 45° so that an oblique surface 3 was formed. When the dies 4 and 5 are in the compressing position, this surface 3' and the sidewalls of dies 4 and 5 are retracted to permit the molding mixture to be filled into the area between the core 2 and the dies, this chamber 6 is likewise filled with the molding material. Although this material in chamber 6 is likewise heated during the compressing operation of the dies 4 and 5 it will not be compressed by the latter but form a loose crumbly residue in chamber 6. When the compressing operation is completed and the dies 4 and 5 are retracted from the finished container, this crumbly material will fall to the bottom of the mold and must then be carefully and completely removed therefrom since otherwise the next container will be defective.

This difficulty is completely overcome according to the present invention by also compressing the excess material on the corners of the container which has been filled into the chamber in the corner of the stationary guide element of the mold between its adjacent guide surfaces for the dies. According to the invention this material is compressed into the shape of a narrow strip or bar which extends along the corner of the container and has the same solidity as the latter and is preferably connected thereto only by a very thin web. After the finished container has been removed from the mold, this strip or bar may be broken off completely along this thin connecting web.

The method according to the invention will hereafter be described in detail with reference to FIG. 2 which is again a horizontal section through the mold which is taken along the dot-and-dash line II-II of FIG. 4 and shows an upright corner of the container. The walls of the container are again designated by the numeral 1 and the stationary core of the mold by the numeral 2. The two lateral dies 14 and 15 which are movable in the directions of the arrows $a$ and $b$ are shown in their fully compressed position. The dash lines 14' and 15' indicate the position of the pressure surfaces of the two dies in their retracted positions. The dotted line 1 indicates like in FIG. 1 the position of the upper edge of the container walls 1 which is not visible in the drawings because it is covered up by the dies 14 and 15 in their compressing position.

The method according to the invention requires the lateral dies 14 and 15 to be made of a width greater than that of the walls 1 of the container to be molded. Consequently, the guide surfaces of each stationary guide element 13 for the dies 14 and 15 are outwardly offset by a distance $x$ from the outer surfaces of the container walls 1. The corner between the two guide surfaces of guide element 13 is inclined at an angle of 45° so as to form a surface 13' which, however, is considerably narrower than the inclined surface 3' of the guide element 3 of the previous mold as shown in FIG. 1.

Figure 2:
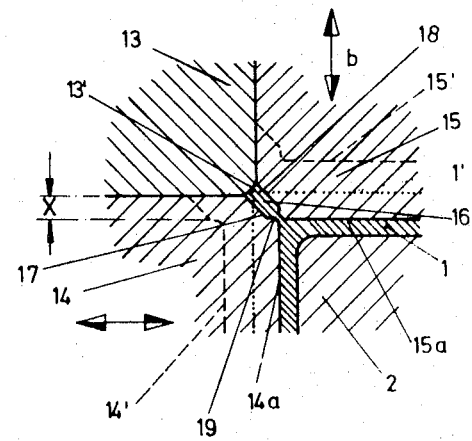
FIG. 2 shows a similar horizontal section which is taken along the line II-II of FIG. 4 and illustrates a mold according to the present invention.

The upright corner of each die 14 and 15 between its surface which is slidable along the respective guide surface of guide element 13 and the pressure surface 14a or 15a which produces the outer surface of the respective container wall 1 is offset and inclined toward the rear (as seen with reference to the direction of the compression movement of each die) so as to form an inclined surface 17 or 18 between the lines which are determined by the distance $x$, as mentioned above. Each of these surfaces 17 preferably extends at an angle of 45° to the adjacent guide surface of the guide element 13, and when the two adjacent dies 14 and 15 are in the fully compressed or closed position as shown in FIG. 2, the adjacent surfaces 17 and 18 together with the inclined corner surface 13' of guide element 13 enclose a narrow chamber 16. The adjacent edges of the pressure surfaces 14a and 15a of the two dies which are to form the upright corner between the container walls 1 are slightly chamfered so that, when the dies are in the fully closed position, a narrow slot remains which connects the chamber 16 with the edges of the pressure surfaces 14a. Of course, what has here been said with reference to the upright corners of the mold parts 13, 14 and 15 for producing the upright corner between the container walls 1 as shown in FIG. 2 is equally applicable to the other upright corners of the mold parts and corners of the container.

For carrying out the method according to the invention, the dies 14 and 15 are first retracted so that their pressure surfaces are in the positions as indicated by the dash lines 14' and 15'. The molding mixture is then poured into the open mold. When the mold is then heated and closed by moving the dies 14 and 15 toward the core 2 to the position as shown in FIG. 2, not only that molding material will be compressed and cured which results in the container walls 1, but also the excess material which is collected in the chamber 16 (as also indicated by the dot-and-dash line in FIG. 4 which then forms a solid strip or bar which extends along the corner of the container between the walls 1 and is connected to this corner by a thin web 19 which is formed as the result of the chamfered upright edges of dies 14 and 15 at the ends of the pressure surfaces 14a and 15a adjacent to the inclined surfaces 17 and 18. After the container walls 1 including their strip-shaped corner extensions 16 and the small intermediate webs 19 are fully compressed and cured, dies 14 and 15 are again retracted and the upper die 7 as shown in FIG. 4 is fully withdrawn whereupon the finished container with the strips 16 thereon is removed from the mold in the direction vertical to the plane of FIG. 2. Strips 16 may then be broken off the upright corners of the container and, since this obviously occurs along the weakest part, namely, along the webs 19, the corners between the adjacent container walls 1 will be clean of any projections, except for a possible small burr on each corner which may be easily removed.

The problems which had to be solved regarding the upright corners of the container in the manner as previously described also apply similarly to the corners between the bottom and the sidewalls of the container. When the loose material is filled into the mold and fills the space in which the sidewalls 1 as well as the bottom of the container are to be molded, there will also be excessive material along the corners between the bottom and sidewalls.

Figure 3:
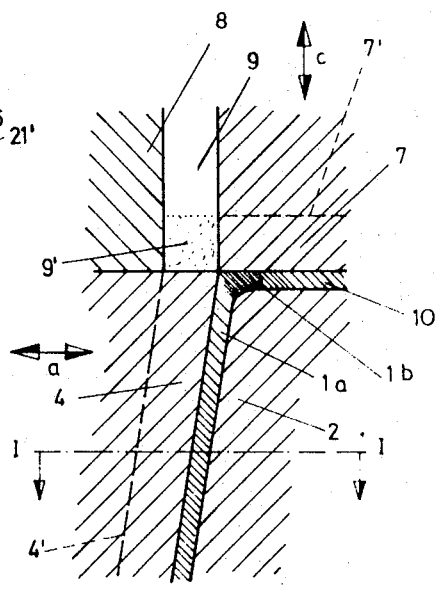

The conditions regarding these corners which prevail in the conventional methods of producing such containers will first be briefly described with reference to FIG. 3, in which the sidewalls of the container are again designated by the numeral 1, the stationary core of the mold by the numeral 2, and one of the lateral dies by the numeral 4, while the bottom of the container is designated by the numeral 10. The lateral dies 4 are again movable in the direction of the double-arrow $a$, while the upper die 7 for the container bottom 10 is movable vertically in the direction of the double-arrow $c$. The container is therefore molded in an upside-down position. Dies 4 and 7 are shown in their fully compressed position, while the dash lines 4' and 7' indicate the pressure surfaces of these dies in their retracted positions. In order to be able to fill the loose molding material from above into the mold and to remove the finished container upwardly from the mold, the stationary guide element 8 for guiding the lateral dies 4 is set back as far from the adjacent lateral surface of die 7 as corresponds to the distance to which the lateral dies 4 may be retracted from their most forward positions. There is thus a chamber 9 formed between the vertically moving die 7 and the guide element 8. At the end of the molding operation when the mold is in its completely closed position as illustrated in FIG. 3, this chamber 9 will contain the excessive amount of material 9' which is not compressed but cured by the heat of the mold and therefore has a loose crumbly consistency. When the dies are then retracted, this crumbly material falls downwardly into the mold and must be carefully removed therefrom in the same manner as described with regard to the material 6 adjacent to the lateral corners, as shown in FIG. 1. This again requires considerable time and physical effort and entails the danger that the next container will be defective if this waste material is not completely removed from the mold. Since the guide elements for the lateral dies must be laterally spaced from the upper die in order to permit the mold to be properly filled, these disadvantages occur not only in the upside-down production of containers with inclined walls or with walls with an outwardly projecting rim on its open end where these guide elements might interfere with the removal of the finished container in the upward direction, but they occur also in the production of containers with vertical and plane walls. Although on containers with such walls the excess material might possibly be compressed into the corner portions between the container bottom and the sidewalls, this can be done only on containers on which these corners are very rounded, but never on containers with sharp corners.

In order to insure that this excessive material will be completely removed from the mold together with the finished container, the invention further provides a procedure similar to that as already described with reference to the upright corners between the sidewalls of the container. However, the operations of filling the mold and removing the finished container require the parts of the dies for molding the corners between the bottom and sidewalls of the container and the strip-shaped outer extensions of these corners to be made of a different shape.

Figure 4:
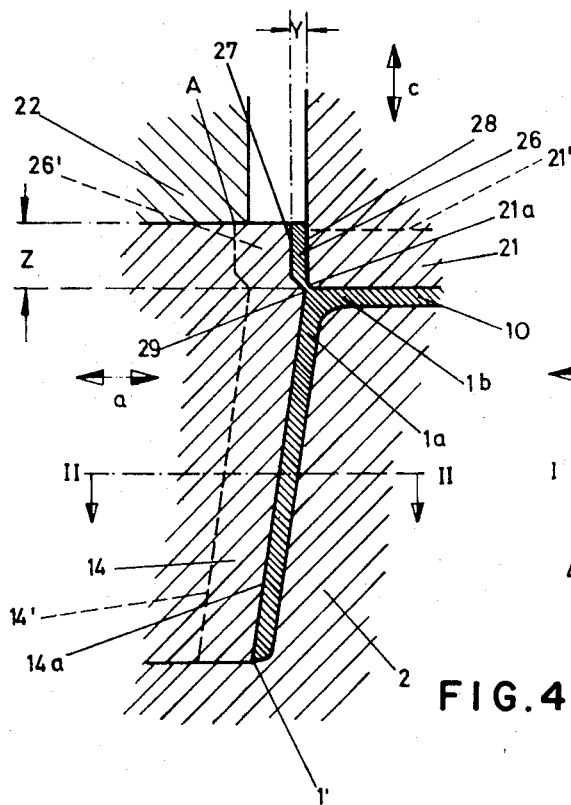
FIG. 4 shows a similar vertical section of the mold according to the invention as shown in FIG. 2.

One particular manner in which this part of the invention may be carried out is illustrated by way of example in FIG. 4, in which the numeral 1 again designates one of the sidewalls of the container, 2 designates the core of the mold, and 10 designates the container bottom. The lateral die 14 for molding the sidewall 1 and the vertically movable die 21 for molding the bottom 10 are illustrated in the fully compressing position, while the dash lines 14' and 21' indicate the retracted positions of these dies before the compressing operation. The horizontal guide surface of the stationary guide element 22 of the mold and the upper surface of the lateral die 14 which is slidable along this guide surface are parallel to and located above the plane of the intended upper surface of the container bottom 10 and spaced from this plane at a distance $z$. The vertical end surface of guide element 22 for the upper die 21 is slightly offset toward the rear of a vertical projection of the outer edge 1' of the container wall, as indicated by the dot-and-dash line 16 in FIG. 4 which corresponds to the outer edge of the strip 16 on the upright corner of the container as shown in FIG. 2, so as to permit the finished container to be lifted out of the mold past the guide element 22 after the lateral die 14 has been retracted to the position of the dash line 14' and the upper die 21 has been lifted completely out of the mold. The pressure surface of die 14 consists of a large lower part 14a and a short upper part 27. The lower part 14a serves for compressing the sidewall 1 of the container and therefore has the same shape and the same height as the outer surface of this wall up to the level of the upper surface of the container bottom 10. The short upper part 27 of the pressure surface of die 14 above this level is recessed from the upper end of the lower part 14a for a distance $y$ which corresponds substantially to the thickness to which the sidewall 1 is to be compressed and it extends vertically to the plane of the upper surface of the container bottom 10. Each lateral edge portion of the upper die 21 is step-shaped in accordance with the shape and the relative positions of the guide element 22, the upper end of the lateral die 14 and the upper part 27 of the pressure surface of this die, and the horizontal pressure surface 21a of the upper die 21. This horizontal surface 21a of die 21 is adapted to compress the container bottom 10, while the vertical part 28 of the step forms an abutment on which the material which in the filling operation has been deposited in the area 26' in front of the upper edge A of the retracted die 14 by the part 27 of the pressure surface of die 14 so as to form a strip-shaped projection 26 of the thickness $y$ and a height equal to the height of the step part 28. This strip-shaped projection is therefore compressed and cured to the same degree as the sidewall 1 and the bottom 10 of the container. In order to prevent the strip 26 from being separated entirely from the container during the simultaneous compression movements of dies 14 and 21, the corner between the pressure surface 21a of die 21 and its vertical part 28 is preferably slightly chamfered so that, at the end of the compression movements of the dies a thin connecting web 29 remains between the strip 26 and the corner between each sidewall 1 and the bottom 10 of the container. After the lateral dies 14 and 15 have been retracted to their positions 14' and 15' and the upper die 21 has been fully retracted from the mold and the finished container has then been lifted out of the mold, the projecting strip 26 may be broken off the container bottom along the web 29 at the same time when the strips 16 are broken off the upright corners of the container, as described with reference of FIG. 2.

After the container has been removed from the mold, the mold is filled again with the required amount of molding material and the upper die is then lowered so that its pressure surface is in the position 21'. Dies 14, 15 and 21 are then moved toward the core 2 for the required distance so as to compress and cure the material including that of the projecting strips 16 and 26. When the material is fully compressed and completely cured, the upper die is again lifted out of the mold, whereupon this finished container may likewise be lifted out of the mold. The projecting strips 16 and 26 are then again broken off and any burrs which might remain from the connecting webs 19 and 29 are removed.

Of course, the design of the mold as well as of the containers to be made may be modified considerably. Thus, for example, it is possible to simplify the mold by omitting the step-shaped outer edge portion of the upper die 21 so that the sidewall of this die extends further upwardly along the dashline A and thus similarly as shown by the full line in FIG. 3, and the area 26' is then open in the upward direction. Although during the compression of the dies the material in this area 26' may then yield upwardly and will not be as highly compressed as the strip 26 in the mold according to FIG. 4, the rate of compression which is then produced will usually be sufficient to give the strip 26 a sufficient solidity to be removed from the mold together with the container.

The mold according to the invention may also be designed so that, instead of projecting upwardly from the outer edges of the container bottom 10, the strip 26 may project horizontally to the outside or even obliquely similar to the strips 16 on the upright corners as shown in FIG. 2. If strip 26 is to project horizontally, guide element 22 and the lateral die 14 would extend to the level of the upper surface of the container bottom 10 and the recess for molding the projecting strip 26 may be provided either in the upper surface of the lateral die 14 or in the lower surface of the upper die 21. Of course, the vertical guide wall of guide element 22 along which the upper die is slidable would then have to be in a position so as also to permit the end of the horizontal strip 26 to pass easily along this guide wall when the container is being removed from the mold.

If strip 26 is to project obliquely from the bottom corner of the container, dies 14 and 21 would be designed similar to dies 14 and 15 as shown in FIG. 2, except that the vertical wall of guide element 22 would have to be spaced from the vertical wall of die 21 similarly as shown in FIG. 4 so that strip 26 could pass along guide element 22 when the finished container is being removed from the mold.

As has previously been indicated, it is advisable to carry out the compressing operation of all dies of the mold substantially simultaneously. If the compressing operation would be carried out in the manner as it was previously done, for example, by first moving only the lateral dies 14 and 15 toward the core 2, the same would occur as indicated in FIG. 3, namely, that the uppermost part of the material to be compressed in the sidewalls 1 would partly escape in the upward direction so that within the area 1a a degree of compression would occur, which is less than required, while thereafter when the upper die 7 moves downwardly, the material which has previously escaped upwardly would be partly compressed by this die together with the normal amount of material for the bottom 10 so that within the area 10a the material would be compressed excessively. The opposite results would occur if the upper die 7 would first carry out the compressing operation of the bottom 10 and the lateral dies 4 would compress the sidewalls 1 thereafter. These conditions which did not become very apparent in the methods as previously carried out are, however, extremely important if the method is carried out according to the invention. If in this case, for example, the lateral dies would first compress the material for the sidewalls of the container, as shown in FIG. 4, the material would partly escape from the sidewall 1 and the strip 26 toward the bottom corner, so that the difference in the compression ratio between the areas 1a and 10a would be much more considerable. This, in turn means, that especially in the area of the bottom corner which is subjected to strong stresses, the material would be very inhomogenous which would endanger the durability of the container. If, however, the production of the containers is carried out in accordance with the invention by compressing and curing all parts of the containers simultaneously the material of each container will be very homogenous and the container will not have any weak or overcompressed areas which may lead to its premature destruction.

If the containers to be produced should have absolutely smooth outer corners when they are removed from the mold, the connecting webs 19 and 29 may also be omitted and these corners may be molded even without having any burrs thereon. In this case, the adjacent dies of the mold are to be designed so as to meet at the respective corners of the container and to compress and cure the excessive material within the chambers in which the strips 16 and 26 are formed but in a manner so as not to adhere to the corners by any connecting webs. When the molding operation is completed these separate strips may be either removed from the mold together with the container or separately therefrom without danger that any residues might remain in the mold.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A method of molding angular containers with an open top in an upside-down position of a nonflowing mixture of comminuted fibrous materials and a hot-setting binder comprising the steps of filling a certain amount of said mixture into the free areas of a mold between the outer wall surfaces of a stationary core corresponding to the inner shape and dimensions of the desired containers and a plurality of adjacent substantially horizontally movable lateral wall-forming dies and at least one substantially vertically movable upper bottom-forming die when said dies are retracted from said core, each of said dies being movable in a different direction at substantially right angles to the respective outer wall surface of said core, and also filling a certain amount of said mixture into the free areas formed outside of the edges of said core between said adjacent retracted dies, and then moving said dies under heat and pressure toward said core so as to compress and cure said mixture and thereby to form said container and also a strip of substantially the same solidity as said container on the outside of at least each upright edge of said container.

2. A method as defined in claim 1, in which said solid strip is also molded on the outside of the edges of said container between its bottom and sidewalls.

3. A method as defined in claim 1, in which each of said solid strips is molded so as to be connected by a very thin web to the respective edge of said container, and further comprising the steps of retracting said dies and removing said molded container with said strips from said mold, and thereafter breaking off said strips along said thin webs.

4. A method as defined in claim 1, in which all of said dies are moved substantially simultaneously toward said core to compress and cure said mixture.

5. A mold for producing angular containers with an open top in an upside-down position of a nonflowing mixture of comminuted fibrous material and a hot-setting binder comprising a core having outer side surfaces and a top surface corresponding to the inner shape and dimensions of the desired container; a plurality of adjacent substantially horizontally movable lateral wall forming dies, each facing a respective one of said side surfaces of said core and a substantially vertically movable upper bottom-forming die facing said top surface of said core, each of said dies being movable in a direction at substantially right angles to the respective facing surface of said core, each of said lateral dies having a pressure surface of a greater width than the respective sidewall of said desired container, each of said pressure surface comprising a first part having dimensions substantially equal to those of the respective side wall and adapted to compress and cure a sidewall of said container, and a second part projecting laterally beyond said first part and forming a corner portion, said corner portion being rearwardly and outwardly inclined with respect to said first part and adapted together with the corner portion of the adjacent lateral die to compress and cure said mixture deposited between said corner portions so as to form a strip of solid material projecting obliquely and outwardly from an upright edge of the finished container.

6. A mold as defined in claim 5 further comprising an angular stationary guide element between said adjacent lateral dies having guide surfaces for guiding said lateral dies and having an upright edge at the front end of said guide surfaces facing an upright edge of said core, said edge of said guide element being chamfered so as to form a surface of a width equal to the thickness of said strip and limiting the extent thereof in its outward direction from the respective upright edge of said core and said container when said dies are moved toward said core to compress said sidewalls and said strips.

7. A mold as defined in claim 5, in which each of said lateral dies has a greater height than the sidewall of the container to be molded thereby and a main pressure surface of a height equal to the height of said sidewall up to the level of the outer surface of said container bottom for compressing and curing said sidewall and a shorter additional pressure surface projecting above said level at least to the level of the uncompressed mixture filled into said mold when said dies are retracted, said additional pressure surface being recessed from the upper end of said main pressure surface by a distance substantially equal to the thickness of said compressed sidewall and extending parallel to the adjacent lateral surface of said upper die and adapted to compress and cure said mixture which has been filled into the area above said level on said lateral surface so as to form a strip-shaped projection above said bottom level.

8. A mold as defined in claim 7, in which said upper die has a lateral width greater than the outer surface of said bottom to be molded and has a pressure surface equal to the size of said outer bottom surface and a lateral projection on each side of said pressure surface, said projection forming a step-shaped recessed edge portion first extending upwardly from the end of said pressure surface for a distance substantially equal to the height of said additional pressure surface of each wall-forming die and then substantially parallel to said pressure surface of said upper die for a distance greater than the depth of the recess formed by said additional pressure surfaces.

9. A mold as define in claim 5, in which, when said lateral dies are in their fully compressed position, the edge between said first and second parts of said pressure surface of one of said dies engages with the corresponding edge of the adjacent lateral die, whereby said strip molded between said second parts of said two lateral dies is severed from the upright edge of said container.

10. A mold as defined in claim 5, in which the edge between said first and second parts of said pressure surface of each lateral die is slightly chamfered so that, when said lateral dies are in their fully compressed position, said edges of two adjacent lateral dies are spaced at a very small distance from each other in which a thin web if formed which connects said strip to the upright corner of said container.

11. A mold as defined in claim 7, in which when said dies are in their fully compressed position, the edge between said main pressure surface and said recessed additional pressure surface of one of said lateral dies engages with the outer edge of the adjacent pressure surface of the upper die whereby said strip-shaped projection is severed from the outer edge between said bottom and said sidewall.

12. A mold as defined in claim 7, in which the edge between said main pressure surface and said recessed additional pressure surface of one of said lateral dies and the outer edge of the adjacent pressure surface of the upper die are slightly chamfered so that, when said dies are in their fully compressed position, said edges are spaced at a very small distance from each other in which a thin web is formed which connects said strip-shaped projection to the outer edge between said bottom and said sidewall.

13. A mold as defined in claim 6, in which said pressure surface of at least one of said lateral dies is outwardly and downwardly inclined from a plane coinciding with the outer surface of said bottom to be molded to the free outer edge of said container, said chamfered upright edge of said stationary guide element being disposed with respect to a vertical projection of said free outer edge of said container so that, when said container has been molded and is lifted in the upper direction from said mold when said dies are retracted, said outer edge of said container will slide freely passed said chamfered edge.